INVENTOR:
DAVID SCIAKY,
BY Hume Groen Clement & Hume
ATTYS.

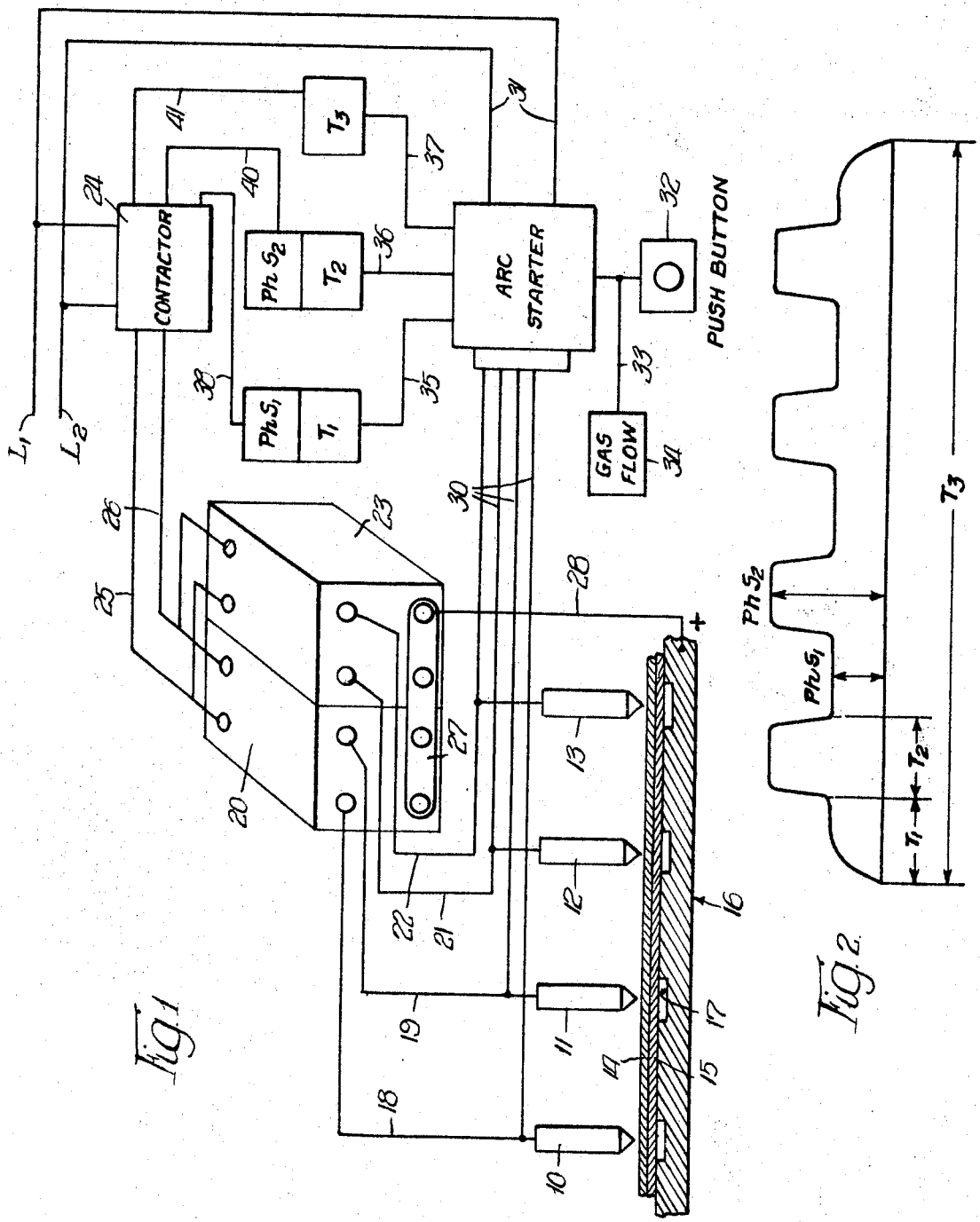

United States Patent Office 3,449,543
Patented June 10, 1969

3,449,543
TIG SPOT WELDING BY MEANS OF A PULSATING UNIDIRECTIONAL CURRENT
David Sciaky, Chicago, Ill., assignor to Welding Research, Inc., Chicago, Ill., a corporation of Illinois
Filed Apr. 11, 1966, Ser. No. 547,062
Int. Cl. B23k 9/12, 9/18, 9/24
U.S. Cl. 219—131                                4 Claims

ABSTRACT OF THE DISCLOSURE

The invention provides a method and apparatus for producing a pulsating unidirectional current useful in Tig spot welding. The unidirectional current includes pulses of high magnitude alternating with pulses of low magnitude and the same are produced by a pair of phase shift circuits having timers and which control the duration of the respective pulses and also control a contactor which functions to alternately supply the phase shifted outputs to rectifying means.

---

The invention relates to arc welding and has reference in particular to an improved method of Tig spot welding wherein a pulsating unidirectional current is employed in place of the direct current of uniform magnitude as heretofore used.

In the joining of overlapped metal sheets by the well known arc welding process, a regular welding torch is held above the area where a local weld is to be made and an arc is produced between the electrode tip and the metal workpiece. The electrode is connected to one terminal of the current source and the metal workpiece is connected to the other terminal. It is possible to start the arc by applying momentarily an impulse from an auxiliary high voltage or high frequency source. In the welding method known as Tig spot welding the electrode consists of a thin tungsten rod and the same is surrounded by a flow of protective inert gas during the welding operation. In a similar welding method generally referred to as Mig spot welding the tungsten rod is omitted and the metal wire or rod which is fed into the welding area constitutes the electrode.

The results obtained by the welding methods as above described are not always uniform. Both methods have certain shortcomings which prevent their industrial use as a reliable and economical joining procedure for overlapping metal sheets and/or metal plates. One of the disadvantages which exists when joining two overlapping sheets by means of several spaced spot welds, is that the location of the connection of the workpiece with the current supply has an influence on the shape of the welds. For example, when the connection is located at one end of a row of welds, the direction of flow of the current from the spot to the connection and the resulting magnetic field influences the position of the arc produced between the electrode and the workpiece. As regards Tig welding in particular, the arc is displaced by the interaction of its magnetic field with that of the workpiece and as a result the welded zone on the surface and in the core of the material exhibits an asymmetrical instead of a regular round shape. When the aforementioned row of spots is made by means of several welding torches arranged in a row and fired simultaneously, the effect of distortion of the weld geometrically is particularly pronounced and as a result the appearance of the workpiece is impaired and, in addition, the resulting welds are of unequal strength.

Another disadvantage of the known method is that the surface of the sheet exposed to the arc exhibits a large and irregular heat affected zone at the mating surfaces of the sheets and which is out of proportion to the diameter of the actual weld. A further disadvantage of the known methods is that the top surface of the overlapping sheet and the bottom surface of the second sheet exhibit a circular indentation caused by the thermal contraction or suckback of the metal which take place when the heated zone cools down. It is generally desirable that the appearance of the outer surfaces of the sheets remain unmarred by the welds. The removal of this indentation by grinding or other finishing methods is both difficult and costly. Very often the impossibility of removing this surface defect makes the process impractical.

Another disadvantage of the arc welding methods as heretofore practiced concerns the excessive inconsistency in weld strength when the two sheets do not bear perfectly on each other at the spot to be welded. Also the tendency for the liquid metal to be expelled from the weld cavity due to the sudden freeing of gases from the metal, results in holes blown in the material. Shallow penetration of the weld and relatively short electrode life may also be mentioned as objectional features which exist in conventional arc welding methods.

The present invention has for an object the provision of an improved Tig welding method wherein the aforementioned shortcomings and disadvantages have been substantially eliminated. The method essentially consists in controlling the flow of current in the arc in such a way that during the welding operation the current is caused to pulsate, preferably from a low current value at the initiation of the arc to an increased current value following a predetermined time interval, the pulsations being repeated once or several times during the welding operation depending on the thickness of the parts to be welded. The current curve may be described as having the shape of a successive number of current impulses.

Another object of the invention resides in the provision of a Tig welding method employing a pulsating unidirectional current and wherein the magnitude of the current impulses, their duration and the number of impulses for a welding operation are independently adjustable.

Another and more specific object of the invention is to provide an improved method of Tig spot welding which can be employed in the joining of numerous assemblies that heretofore had to be joined by the resistance welding process. The present method is superior to resistance welding since it eliminates the use of the electrode pressure which in the case of multiple spot welding machines requires heavy frames and hydraulically operated guns. The present process also eliminates the necessity of water cooling with all of its inconveniences, and substantially reduces the power demand because of the elimination of the leads in the secondary circuit of resistance welding equipment. The present method also makes possible an arrangement of multiple electrodes of light weight and easy access, since heavy welding transformers are eliminated in addition to the elimination of high current conductors and multiple water cooling hoses.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 1 is a schematic showing of one form of apparatus capable of performing the present method and which illustrates the current connections, the timing means and heat control means for an arrangement of several tungsten electrodes;

FIGURE 2 is a graph showing a typical unidirectional pulsating current found appropriate for welding two lapped sheets of mild steel according to the present method;

Figure 3:
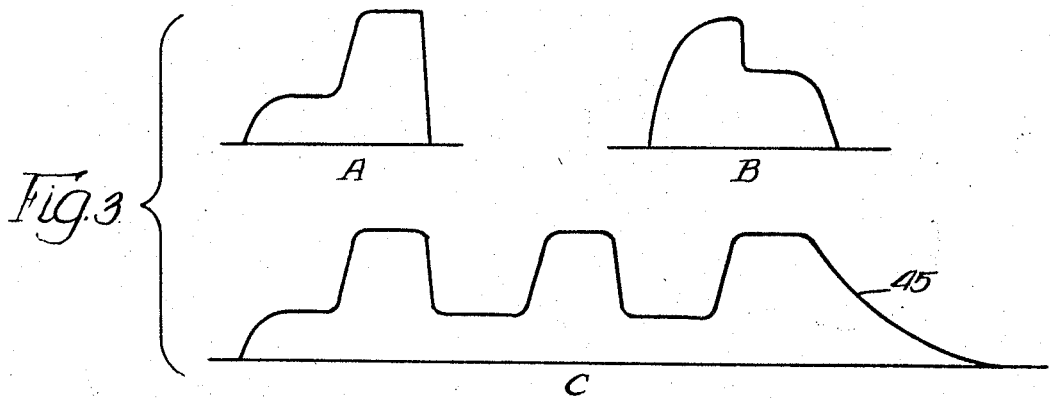
FIGURE 3 shows three graphs illustrating different curves of current flow and wherein current impulses follow each other with different durations and magnitudes.

In the apparatus as shown in FIGURE 1 the numerals 10, 11, 12 and 13 represent Tig welding devices having tungsten electrodes and which are positioned immediately above a pair of overlapping metal sheets 14 and 15 which are to be welded. The backing member 16 for the said metal sheets, and which is preferably of copper, is formed according to the invention with a number of recesses 17 which may be a groove or a cavity, the same being located immediately below the electrodes 10 to 13, inclusive, for purposes to be presently described. Electrodes 10 and 11 are connected by conductors 18 and 19 to a direct current source 20. In a similar manner electrodes 12 and 13 are connected by the conductors 21 and 22 to a similar direct current source 23. The elements 20 and 23 are each supplied with an alternating current, preferably of sixty cycle frequency, from the contactor 24 by means of the conductors 25 and 26. The contactor 24 is, in turn, electrically connected to an alternating current source indicated by lines $L_1$ and $L_2$. It will be understood that each of the elements 20 and 23 contain a transformer and a rectifier, preferably a dry plate rectifier, whereby the alternating current supplied to these elements by the contactor is reduced in voltage and rectified into a unidirectional current before being supplied to the electrodes. The positive terminals of the elements 20 and 23 are electrically connected by the bar 27 and all four terminals are connected by the conductor 28 to the copper backing member 16.

The four electrodes are also electrically connected by conductors 30 to an arc starter which is, in turn, supplied with alternating current from the line $L_1$ and $L_2$ by conductors 31. A push button 32 for initiating the arc starter and for also intiating the start of the welding period, is electrically connected to the arc starter. By means of the conductor 33, the element 34 for controlling the flow of the inert gas is interposed in the circuit. The flow of the protective inert gas which is supplied in a manner to surround the welding area is accordingly initiated when the push button is depressed as is also the arc starter, the latter supplying a short impulse of high voltage to the electrodes so as to start the arc. The timers $T_1$, $T_2$ and $T_3$ are electrically connected to the arc starter by the conductors 35, 36 and 37. The timers $T_1$ and $T_2$ have associated therewith a phase shifting element such as $PhS_1$ for timer $T_1$ and $PhS_2$ for timer $T_2$. The conductor 38 electrically connects phase shift element $PhS_1$ to the contactor 24, whereas conductor 40 in a similar manner electrically connects phase shifter $PhS_2$ to the contactor. Timer $T_3$ is connected to the contactor by the conductor 41 and this timer, which may comprise an impulse counter, is provided to determine the overall duration or the number of impulses of the welding operation.

As previously described when the push button is depressed to initiate the start of the welding operation a high voltge impulse is supplied to the four electrodes for starting the arc and to start the flow of current from the electrodes to the overlapping metal sheets comprising the workpiece. Timer $T_3$ is thereupon effective to cause the contactor 24 to supply alternating current to the elements 20 and 23. Either timer $T_1$ or $T_2$ is also effective at this time in controlling the contactor. The particular phase shift circuit which will be initially effective will depend on which timer is initially rendered operative. The alternating current is reduced in voltage and rectified and then supplied through the conductors 18, 19, 21 and 22 to the four electrodes.

As shown in FIGURE 2, the timer $T_1$ and the phase shift circuit $PhS_1$ are effective at the start of the welding period for controlling the contactor and whereby the direct current supplied to the electrodes is of a low or a reduced value. The setting of timer $T_1$ will control the number of cycles of alternating current supplied to the elements 20 and 23 and thus this timer will control the duration of the current impulse of reduced value. For the curve shown in FIGURE 2, the duration of this reduced current flow may comprise five cycles. At the end of this time interval, timer $T_1$ becomes inoperative and timer $T_2$ becomes operative so that the phase shift circuit $PhS_2$ controls the contactor and this results in supplying a direct current of increased magnitude to the four electrodes. Here again, for FIGURE 2 the duration of this increased current flow may comprise five cycles of the alternating current whereupon timer $T_2$ is rendered inoperative. Timer $T_1$ now becomes operative again and a current of reduced magnitude as controlled by the phase shift circuit $PhS_1$ is again supplied to the electrodes. Operating cycles as described are repeated until the timer $T_3$ terminates the welding operation. For the curve shown in FIGURE 2 this will include four impulses of high current, the first impulse beng preceded by an impulse of reduced current and wherein a similar impulse of reduced current follows the last impulse of high current. Each of the impulses, both high and low, have been described as having a value of five cycles of the alternating current source. Accordingly the entire welding period has a duration of forty-five cycles.

The phase shifting circuits are conventional, the same including an electronic power control means such as an ignitron and associated elements for shifting the firing point of the ignitron in relation to the sine wave of the alternating current power source. Referring again to the pulsating curve of FIGURE 2, the phase shift means $PhS_1$ can be adjusted so that the lower current impulses will supply a direct current to the electrodes of approximately one hundred and thirty five amperes. The phase shift means $PhS_2$ can likewise be adjusted so that the higher current impulses may approximate two hundred and seventy amperes. When spot welding mild steel, having a thickness approximately of .032″ for each of the sheets, by the apparatus of FIGURE 1 and with a pulsating unidirectional current of the value as stated and as graphically illustrated in FIGURE 2, a shear strength of 1200 pounds per spot weld can be obtained.

In FIGURE 3 the graphs A, B and C show different curves of current flow for various combinations of high and low current impulses having different durations and different current magnitudes. The graph C of this figure additionally shows at 45 a slow tapering down of the current for the last pulse of high current. This slow tapering down of the last high current pulse is particularly useful in welding those materials wherein cracks might result from a too rapid cooling down period.

Figure 8:
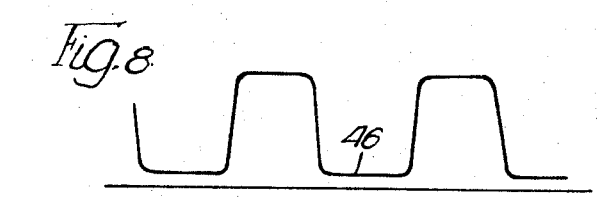
FIG. 8 is another graph illustrating a pulsating current such as may be employed in the present method and wherein the magnitude of the reduced current impulses is a minimum.

In the graph shown in FIGURE 8 the magnitude of the reduced current is a minimum. The current level of the reduced impulse 46 may approximate four or five amperes which is sufficient to form a pilot arc so as to maintain the arc between the electrodes and the workpiece before the high current periods are initiated. In this way it is possible, when required in certain cases, to allow a sufficient cooling down of the material between the high current periods without the necessity of maintaining the high frequency arc starting current, or the necessity of applying an arc starting impulse for the initiation of every subsequent high welding current periods.

Figure 4:
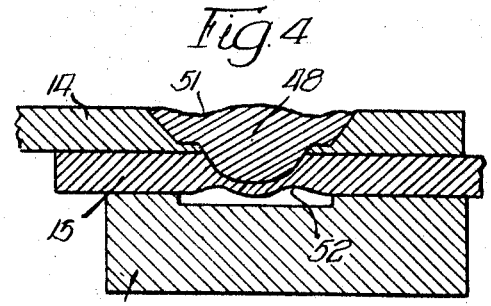
FIGURE 4 is a sectional view taken through overlapping sheets and showing a weld such as obtained by conventional arc welding methods.
Figure 6:
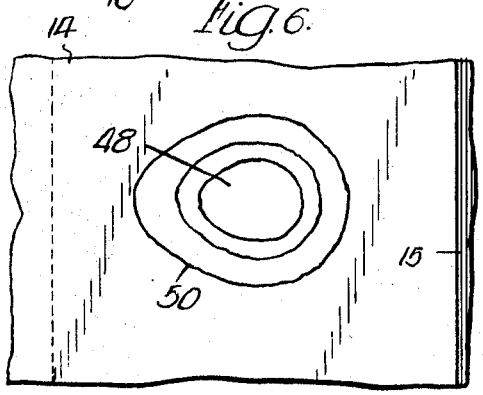
FIGURE 6 is a top plan view illustrating the irregular shape of the weld of FIGURE 4.

In FIGURE 4 a spot weld 48 produced by conventional arc welding methods is disclosed. It will be observed that the weld has a relatively large diameter and that the circumference 50 as shown in FIGURE 6 is rough and uneven. Also an annular depression 51 extends around the circumference of the weld surface and on the bottom surface of the underplate 15 an annular indentation 52 exists. When the appearance of the welded piece has to remain unmarred by the welds, it is difficult to remove the indentation 52 on the undersurface of sheet 15 either by grinding or by any other finishing method.

Figure 5:
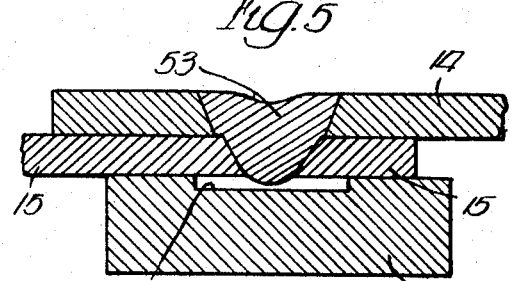
FIGURE 5 is a sectional view taken through overlapping sheets and showing a weld such as obtained by the present improved method of Tig welding.
Figure 7:
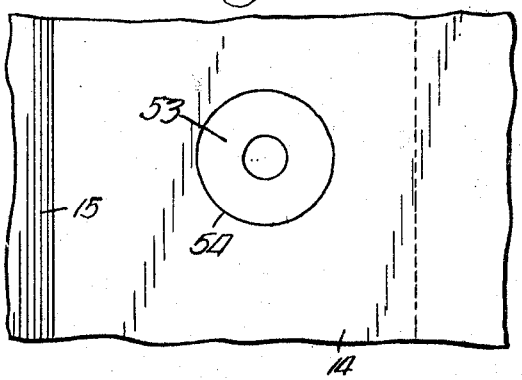
FIGURE 7 is a top plan view illustrating the substantially perfect circular shape of the smaller weld of FIG. 5.

In FIGURE 5 the weld 53 is typical of those spot welds produced by the present method. It will be observed that the size of the melted zone is materially reduced over that shown in FIGURE 4, although the diameter of the welded joint at the mating surfaces of the two sheets remains as large as in FIGURE 4 and that the circumference 54 of the same as shown in FIGURE 7 is substantially a perfect circle. The annular depression on the top surface of plate 14 has been eliminated in addition to the elimination of the annular indentation on the undersurface of plate 15. It will be further observed that the weld 53 is considerably deeper than the conventional weld 48 and does in fact penetrate through the lower sheet of metal being welded.

The improvements in the weld 53 are the direct results of the pulsating unidirectional current as employed by the present method. It is known that the welding arc consists of an arc plasma and of a surrounding arc flame. The highest temperature of the arc is in the center of the arc or arc plasma. During the welding process the arc flame preheats the material surrounding the area where the weld is desired, spreading the heat into the upper sheet of the workpiece. The tendency to spread heat into the upper sheet is reduced by the method of the invention. By pulsating the current the heat which is introduced in the top sheet of the material during the high current periods is dissipated during the low current periods whereas the center of the spot still remains at a very high temperature. The succeeding pulses of high current permit the plasma to penetrate deeper and deeper into the center of the spot without expanding the diameter of the material which is melted on the surface of the upper sheet of metal.

Thus the effect of pulsation makes it possible for the periphery of the heated zone to be cooled by the surrounding colder material during the low current impulses. This results in a relatively smaller heat affected surface. The agitation of the molten metal on the surface of the weld helps to eliminate freed gases from the metal which results in a smaller and a uniformly welded round surface. Also by modulating or pulsing the welding current between two preset levels for periods of time depending upon the characteristics of the material, the interaction between the magnetic field of the arc and the workpiece is substantially minimized. This helps to improve the shape of the weld and particularly so when a row of Tig welding devices are employed. It has also been found that the spot welds thus obtained are consistent in strength and the same holds true when produced by a single welding device or by a series of said devices simultaneously. An additional feature of the present invention resides in the fact that tip life of the electrode is increased by a factor of at least two when using one-eighth inch tungsten electrodes.

In the event a slight gap or imperfect contact may exist between the parts of the workpiece, the same does not result in any substantial variation in the strength of the weld. It appears that the current pulsations and the agitation caused by the same in the melted zone help to bridge the gap between the two sheets and to transmit more effectively the heat from one sheet to the other.

It can be noted that the area melted by the arc consists in a film of molten material. By virtue of the partial metal evaporation caused by the arc, the temperature of which is several times that of the melting point of the metal, sufficient gas pressure is exerted on the melted film to blow it towards the periphery of the heated zone. The solid metal laid bare by this action is in turn melted on its surface and partially evaporated. However, when the current changes, as for example, when it decays to a lower value, the vapor pressure exerted on the melted film diminishes and the surface tension of the film causes it to flow back towards the middle of the heated zone. This fluctuation amounts to an energetic agitation of the melted metal, it favors the escape of occluded gases and better heat transmission in depth is obtained.

This more pronounced thrust of the melted material in depth is an additional improvement obtained by the present method. As previously mentioned a cavity 17 is provided in the copper backing plate 16. The protuberance which forms on the undersurface of the bottom sheet will enter this cavity. Since the spot weld of the invention is smaller in size and also due to the pulsating action of the current in producing the weld, the indentation which heretofore surrounded the protuberance is eliminated. It is possible by relatively inexpensive grinding procedures to remove the protuberance from those assemblies where the surface appearance is important.

Modifications in the diameter of the spot weld and in the depth of the weld can be made as desired to meet the requirements of the particular article being welded by making suitable adjustments of the current levels and in the duration of each pulse and in the overall duration of the welding operation.

What is claimed is:

1. In a method of arc welding employing a non-consumable electrode, the steps which consist in establishing an arc between the electrode and the workpiece to be welded, maintaining the arc for the duration of the welding period by phase shifting an alternating current in such a manner and in rectifying the phase shifted outputs so as to produce pulses of unidirectional current, the same including pulses of relatively low magnitude and pulses of relatively high magnitude, timing the respective pulses of low magnitude and high magnitude so that they include a pre-set plural number of cycles of the alternating current source, and effecting operation of electrical contactor means by the said timing functions so that the contactor means supplies for rectifying purposes the phase shifted outputs of low and high magnitude in succession but in an alternating manner, whereby the pulses of unidirectional current supplied for the welding operation are likewise successive and which alternate between the said two values for the duration of the welding operation.

2. A method of arc welding employing a non-consumable electrode as defined by claim 1, additionally including the step of timing by over-all timing means the operation of the said contactor means for controlling the duration of the welding operation.

3. In a method of arc welding employing a non-consumable electrode, the steps which consist in establishing an arc between the electrode and the workpiece to be welded, maintaining the arc for the duration of the welding period by phase shifting an alternating current and in rectifying the phase shifted output to obtain a unidirectional current pulse of one value, phase shifting the alternating current independently of the first phase shifting operation and in rectifying the second phase shifted output to obtain a unidirectional current pulse of a different value, timing each phase shifting operation so that they include a pre-set plural number of cycles of the alternating current source, controlling the operation of contactor means by the said timing functions so that the first mentioned phase shifted output is supplied for rectifying purposes in a manner which alternates with the supply of the second mentioned phase shifted output, whereby the unidirectional current pulses are successive with the pulses of said one value alternating with the pulses of said different value, supplying said pulsating unidirectional current so as to maintain the arc for the welding period, and timing the contactor means by additional timing means for controlling the duration of the welding period.

4. In arc welding apparatus of the character described, in combination with a source of alternating current, of an electrode disposed in arc producing relation with a workpiece to be welded, alternating current rectifying means having a positive and a negative terminal, a conductor connecting the positive terminal with the workpiece, another conductor connecting the negative terminal with the electrode, a phase shift circuit for phase shifting the alternating current of said source to produce a phase shifted output of one value, a second phase shift circuit for phase shifting the alternating current of said source to produce a phase shifted output of a different value, an electrical contactor interposed in the electrical connections from the phase shift circuits to the rectifying means whereby the electrical contactor supplies the phase shifted outputs to the said rectifying means, a timer in electrical associated relation with each phase shift circuit for timing the respective phase shifted outputs so that they include a pre-set plural number of cycles of the alternating current source, said timers through their respective phase shift circuit have electrical connection with the contactor whereby the contactor is controlled in a manner to supply the phase shifted outputs to the rectifying means in a consecutive but alternating manner, and said rectifying means rectifying the respective phase shifted outputs to produce unidirectional current impulses of pre-set duration and of different current values and which are supplied to the electrode in an alternating manner.

References Cited
UNITED STATES PATENTS

| | | | |
|---|---|---|---|
| 3,199,016 | 8/1965 | Greene et al. | 219—131 X |
| 3,242,309 | 3/1966 | Anderson et al. | 219—131 X |
| 3,339,107 | 8/1967 | Aldenhoff | 219—131 X |
| 3,346,799 | 10/1967 | Aldenhoff | 219—131 X |
| 3,361,892 | 1/1968 | Spencer | 219—131 |

RICHARD M. WOOD, *Primary Examiner.*

J. G. SMITH, *Assistant Examiner.*